United States Patent [19]

Hargreaves

[11] 4,044,911
[45] Aug. 30, 1977

[54] HEAT INSULATION SYSTEM

[75] Inventor: Clifford McDonald Hargreaves, Eindhoven, Netherlands

[73] Assignee: U.S. Philips Corporation, New York, N.Y.

[21] Appl. No.: 650,368

[22] Filed: Jan. 19, 1976

Related U.S. Application Data

[63] Continuation of Ser. No. 483,612, June 27, 1974, abandoned.

[30] Foreign Application Priority Data

July 13, 1973 Netherlands .......................... 7309766

[51] Int. Cl.$^2$ .......................... F16L 59/08; F17C 3/08
[52] U.S. Cl. .................................. 220/9 LG; 220/9 D
[58] Field of Search .................... 220/9 C, 9 D, 9 LG, 220/1 D

[56] References Cited

U.S. PATENT DOCUMENTS

| 3,018,016 | 1/1962 | Hnilicka ............................. 220/1 D |
| 3,357,586 | 12/1967 | Matsch et al. ........................ 220/9 C |
| 3,357,587 | 12/1967 | Weishaupt ........................... 220/9 C |
| 3,380,614 | 4/1968 | Lecomte et al. ...................... 220/9 C |
| 3,416,693 | 12/1968 | Covington et al. ................... 220/9 C |

FOREIGN PATENT DOCUMENTS

1,096,748  12/1967  United Kingdom ................ 220/9 D

*Primary Examiner*—Stephen Marcus
*Attorney, Agent, or Firm*—Frank R. Trifari; Rolf E. Schneider

[57] ABSTRACT

Heat insulation system in which the spacing of the facing surfaces of two adjacent radiation-reflecting layers satisfies the relationship $d \geq (0.1/T)$, where T is the mean operational temperature of the two layers expressed in °K, and d is expressed in cm.

3 Claims, 3 Drawing Figures

HEAT INSULATION SYSTEM

This is a continuation, of application Ser. No. 483,612, filed June 27, 1974, now abandoned.

BACKGROUND OF THE INVENTION

The invention relates to a heat insulation system which is particularly suitable for cryogenic apparatus and comprises a plurality of relatively spaced layers of a radiation-reflecting material. Heat insulation of the type concerned is described, for example, in U.S. Pat. Specifications Nos. 3,009,601 and 3,018,016 and in the article "Multilayer insulation" (Mechanical Engineering, August 1965, pages 23 to 27).

The layers generally consist of foils of a metal, for example aluminium or copper, which are spaced by, for example, glass fibers. The interstices between the foils may or may not be filled with a heat insulating filling material. Such heat insulation is particularly suitable for use in low-temperature systems such as cryostats, storage containers and pipe-lines for liquefied gas. In addition, it obviously may be used in systems of higher temperature level, such as refrigerators, deep freeze chambers, etc., and in high-temperature systems, such, as heat-accumulators in which thermal energy is stored.

Desingers and manufactures of heat insulation systems initially assumed that the insulating effect improved with increase in the number of layers (radiation shields) per unit thickness of the insulation system and hence with increase in layer density. However, measurements made on various superinsulation systems have shown that this is only partly true. When the density of the radiation shields in a given space has reached a given value, adding more shields results in a decrease in heat-insulating capacity (see for example FIG. 2 of U.S. Pat. Specification No. 3,018,016) instead of in a further increase. As an explanation of this phenomenon it has until now been assumed that this is due to heat conduction between the radiation shields owing to local point contacts. This may be a cause, but it is not the only one. Applicant has gained the insight that the impairment of the heat-insulating properties which is found when the spacing between facing surfaces of two adjacent layers is reduced, is due to the occurrence of what will be referred to as a "proximity effect." This proximity effect means that below a given minimum spacing between said surfaces, the heat transfer due to radiation between said layers increases with decreasing spacing and from a spacing slightly less than the said minimum distance is inversely proportional to the fourth power of the surface spacing. In this respect it is equally important that at the small spacings concerned, heat transfer by radiation is substantially temperature-independent (temperature dependence of the emission coefficient of the surfaces here is of secondary importance).

SUMMARY OF THE INVENTION

It is an object of the present invention to provide a heat-insulation system in which, owing to suitable relative arrangement of the layers a minimum number of layers results in a maximum heat-insulating effect.

The heat insulation system according to the invention is characterized in that the spacing between facing surfaces of two adjacent layers satisfies the relationship: $d \geq (0.1/T)$.
Where
$d$ = the spacing expressed in cm, and
$T$ = the mean operational temperature in degrees Kelvin of the two layers. It was found that by this arrangement of the layers, the proximity effect is eliminated and each layer, actually provides a positive contribution to a satisfactory heat-insulating effect.

Embodiments of the invention will now be described, by way of example, with reference to the accompanying diagrammatic drawings:

DETAILED DESCRIPTION OF THE PREFERRED EMBODIMENT

Figure 1:
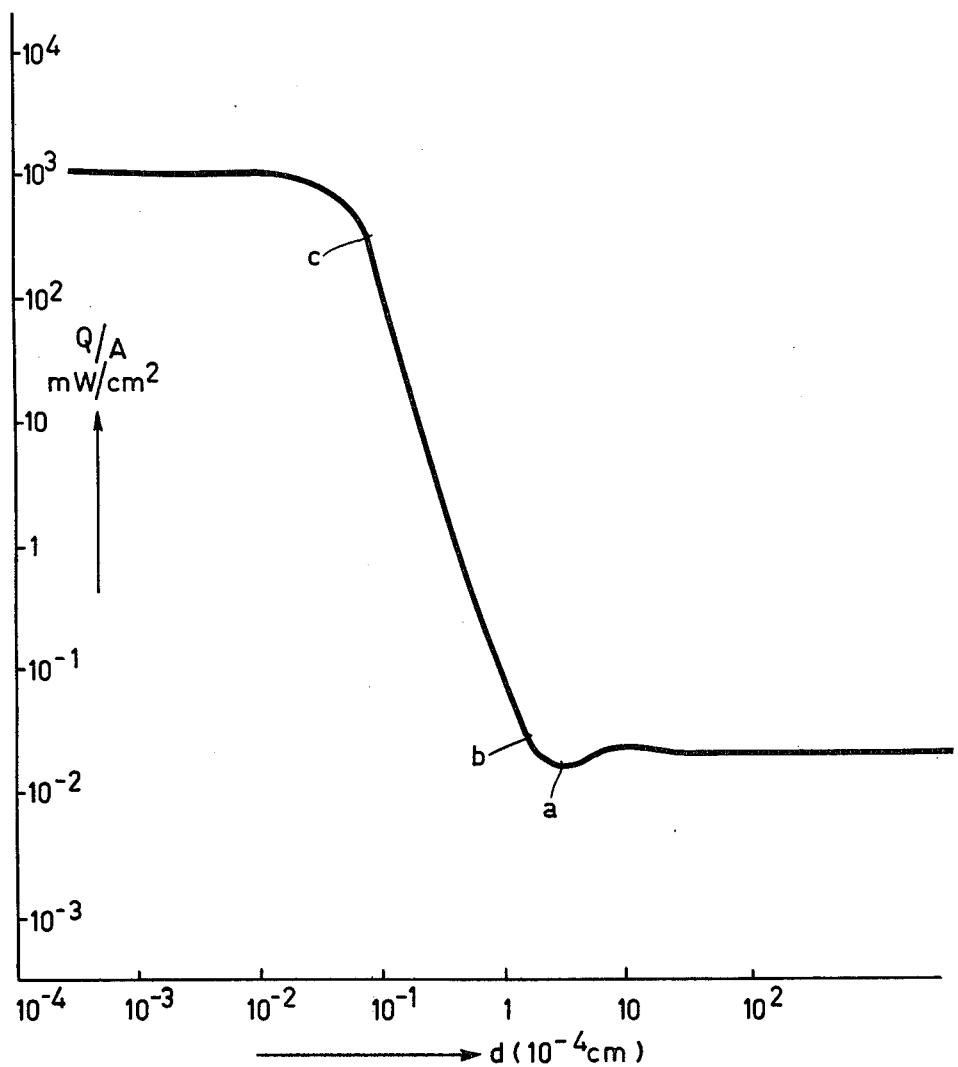
FIG. 1 is a graph in which for two layers the spacing $d$ between the two facing radiation-reflecting surfaces is plotted as the abscissa, and the radiant heat flux Q/A between the layers (A = layer surface) is plotted as the ordinate on a logarithmic scale.

FIG. 1 shows that, starting from a comparatively large spacing between the surfaces, with decreasing spacing the radiant heat transfer between the two layers initially remains constant and then reaches a minimum at a point $a$ of the curve. On further decrease of the spacing, there first is a comparatively gentle increase in the radiant heat transfer over a range $a$–$b$ which is succeeded by a range $b$–$c$ for which the radiant heat transfer is inversely proportional to the fourth power of the spacing between the surfaces ($Q/A = 1/d^4$), which implies that a small decrease in the spacing results in a steep increase in radiant heat transfer.

It has been found that in order to avoid the said "proximity effect," and hence to remain in the region to the right of the point $a$ in the graph the spacing between the surfaces must satisfy the relationship $d \geq (0.1/T)$ (where $d$ is the spacing expressed in cm, and T is the mean temperature in °K of two adjacent layer surfaces).

Figure 2:
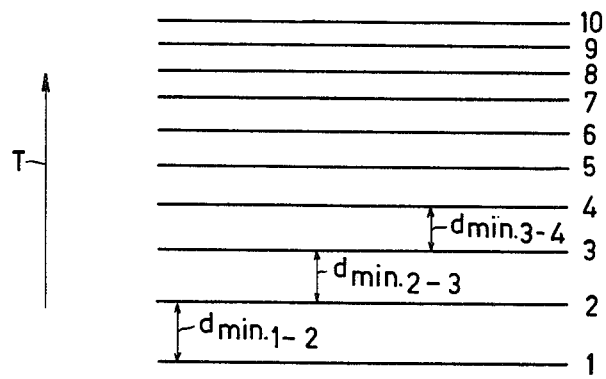
FIGS. 2 and 3 show embodiments of the heat insulation system according to the invention.

FIG. 2 shows a heat insulation system composed of 10 radiation-reflecting layers the facing adjacent surfaces of which are relatively spaced by the minimum spacing $d_{min} = (0.1/T)$. For the sake of clarity, spacers between the layers are not shown. The operational temperature of the layers increases in the direction from layer 1 to layer 10. When the layers 1 and 2 have a mean temperature of for example 20 °K, the distance $d_{min} = (0.1/20)$ cm = 50 μm.

Because the mean temperature of two adjacent layers increases in the direction from layer 1 to layer 10, the minimum spacing between the surfaces of the layers decreases in this direction. This also means that in cryogenic systems in which the insulation system is at a low temperature level, the minimum layer distance is greater than in systems at a higher temperature level.

If an additional layer 11 were interposed between the layers 1 and 2 of FIG. 2, the relative spacing between the surfaces of the layers 1 and 11 and the layers 2 and 11 would be less than the minimum distance $$d_{min_{1-2}} = \frac{0.1}{T}.$$

By means of calculations it can be shown that in this case the radiant heat transfer between the layers 1 and 2 is increased by a factor of 8.

Figure 3:
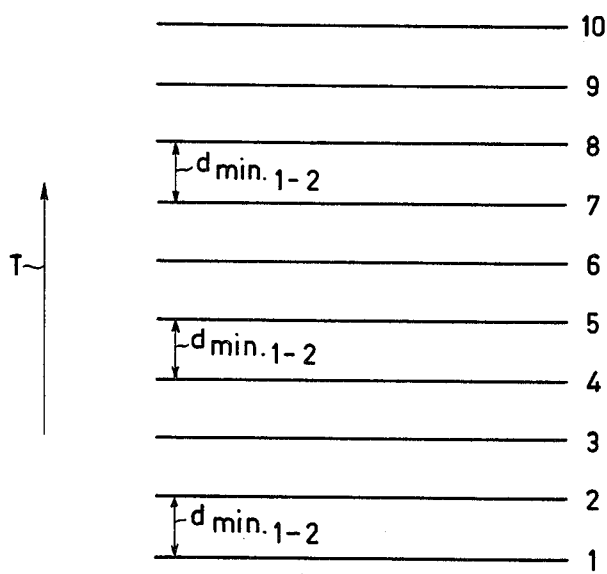

In the heat insulation system shown in FIG. 2, between each pair of adjacent layers the relevent minimum surface spacing $d_{min} = (0.1/T)$ is observed. In practice this means that the layers must be spaced by spacers or layers of heat-insulating filling material of different thicknesses. Should this provide difficulty, then the layers may be spaced by equal spacings which are equal to, or greater than, the minimum distance $(d_{min} = 0.1/T)$ of the two facing surfaces of the layers having the lowest mean temperature. This is shown in FIG. 3. The operational temperature of the layers increases in the direction from the layer 1 to the layer 10. Thus the layers 1 and 2 have the lowest mean temperature. This corresponds to a minimum surface spacing $d_{min_{1-2}}$. This spacing has been used for the layers 2 to 10 also. Although the overall thickness of the system is greater in this embodiment, this is offset by the advantage that equal spacers or filling material of equal thickness can be used between the various layers.

What is claimed is:
1. In a heat insulation system suitable for cryogenic apparatus and including a plurality of spaced layers of a radiation-reflecting material, the improvement comprising the spacing apart of each two adjacent layers having facing surfaces by a distance $d_{min}$ which satisfies the relationship: $d_{min} = (0.1/T)$, where $d_{min}$ is expressed in cm. and T = the mean operational temperature of the two layers expressed in ° K.
2. A system according to claim 1 further comprising glass fibers between said spaced layers.
3. A system according to claim 1 wherein each two adjacent layers are respectively equally spaced and wherein $d_{min}$ is the distance between the two layers having the lowest mean operational temperature.

* * * * *